March 31, 1970 J. W. GORGAS ET AL 3,504,130

SWITCHING SYSTEM FOR ESTABLISHING CONFERENCE CONNECTIONS

Filed Oct. 24, 1966 8 Sheets-Sheet 1

INVENTORS J. W. GORGAS
N. LAZO
T. SIMPSON

BY [signature]

ATTORNEY

SWITCHING SYSTEM FOR ESTABLISHING CONFERENCE CONNECTIONS (CHANNEL SUPERVISORY CIRCUIT)

March 31, 1970 J. W. GORGAS ET AL 3,504,130

SWITCHING SYSTEM FOR ESTABLISHING CONFERENCE CONNECTIONS

Filed Oct. 24, 1966 8 Sheets-Sheet 3

SWITCHING SYSTEM FOR ESTABLISHING CONFERENCE CONNECTIONS

United States Patent Office 3,504,130

Patented Mar. 31, 1970

3,504,130
SWITCHING SYSTEM FOR ESTABLISHING CONFERENCE CONNECTIONS

John W. Gorgas, Marlboro Township, Monmouth County, N.J., Nicholas Lazo, Gahanna, Ohio, and Thomas Simpson, Arvada, Colo., assignors to Bell Telephone Laboratories, Incorporated, Murray Hill, N.J., a corporation of New York Filed Oct. 24, 1966, Ser. No. 589,013
Int. Cl. H04m 3/56
U.S. Cl. 179—18 8 Claims

ABSTRACT OF THE DISCLOSURE

A telephone switching system for establishing conference connections wherein conferees may selectively be chosen by operation of a respective keybutton at the conference originator's telephone as well as by dialing the directory number of any desired conferee not assigned such a keybutton; conferees may be added or removed from the conference connection at any time, all under the control of the conference originator.

This invention relates to telephone switching systems and particularly to arrangements and means for controlling the automatic establishment of multiparty or conference connections and to means for integrating these connections with dial selected conference connections.

It has been previously proposed to set up conference connections in telephone switching offices such as private branch exchanges and central offices.

Among the various types of prior art conference systems there is one particular arrangement identified as automatic conferencing, for example, such as described in Patent No. 3,210,476 to N. R. Shaer, granted Oct. 5, 1965. In accordance with that arrangement the originator conferee dials a special directory number and is thereafter connected to a conference trunk. This conference trunk is associated both with automatic switching arrangements for processing calls and with a memory wherein a repertory of directory numbers is stored.

The automatic switching arrangements are automatically set in motion when the conference trunk is seized and thereafter connections are established to various conferees as predetermined by the stored directory numbers. The automatic switching means continues to function until every stored directory number is represented by a connection to the originator conferee.

Although automatic conferencing offers obvious advantages of speed and convenience, this type of conferencing has some distinct disadvantages.

Prior systems provide a repertory of directory numbers from which the originator conferee may select no less than all conferees. When that arrangement is not suitable and the originator desires to add a new conferee or desires to delete one of those conferees already included in the repertory, the repertory memory must be changed. In prior systems this change requires a major modification of the memory, a change which must be accomplished by the maintenance force. Further, these changes are permanent and thereafter affect all subsequent connections.

It is one object of this invention to overcome the unwielding manner of altering the repertory memory in prior automatic conferencing systems.

It is another object of this invention to enable an originating conferee to alter an automatic conferencing system.

It is another object of this invention to overcome the prior system drawbacks by selecting in an automatic conferencing system the conferees to be included in a conference group.

It is a further object of this invention to permit the conference originator to select from a repertory of predetermined addresses the addresses of conferees desired to form a particular conference group.

It is a further object of this invention to provide in an automatic conferencing system a convenient mode of signaling to select the desired conferees.

It is a further object of this invention to allow the conference originator to add a conferee having a predetermined address to an existing conference group at any time while a conference circuit is maintained.

It is a further object of this invention to permit any conferee identified by a directory number, not a predetermined repertory number, to be added to an existing conference composed of conferees selected from a repertory of predetermined stored addresses.

It is a further object of this invention to allow the originating conferee to signal the directory number of a conferee to be added to the existing automatic conference.

It is a further object of this invention to provide an automatic conference switching arrangement which is alternatively controllable to select a directory number from a stored group of predetermined directory numbers or to accept a directory number which has not been priorly stored for thereafter establishing conference connections.

It is a further object of this invention to establish conference connections using all or part of the repertory of stored addresses and to add to those established connections other conferees not identified by stored addresses in such a manner as to maintain undisturbed those predetermined addresses stored in the memory.

In accordance with this invention arrangements are provided to permit a subscriber to dial a code and thereafter to be connected to a conference trunk. This trunk provides the signaling entrance to the automatic conferencing arrangements. In addition, the originating subscriber is provided with a group of keys for signaling the conference arrangements in order to select the conferees desired on a particular conference connection.

After a connection is established to the trunk, the originator depresses a key momentarily for each requested conferee. Each request is stored temporarily in the automatic conference circuit. After the first request, and thereafter, the conference circuit automatically locates the selected predetermined address and instructs the switching system as to the directory number and the equipment location of the conference port. The process is repeated time after time until all requests are represented by individual connections to the originator.

The ports of the conference bridge circuit are separated into two groups. The first group is devoted to connections to predetermined addresses. The second group is reserved for the so-called "ad-lib" or dial selected conferees.

Associated with the keys used to request predetermined conferees there is a second group of keys for ad-lib requests. To initiate any ad-lib request the originator depresses one of these ad-lib keys and alerts the conference circuit. When all requests for predetermined conferees have been processed by the automatic conferencing arrangement, a signal is transmitted to the originator. This signal causes a lamp to light thereby indicating to the originator that all prior requests are completed and that the conference circuit is now ready to process an ad-lib request. The originator thereafter dials the directory number of the conferee into the conference circuit.

When the number has been received, the conference circuit processes the request in the same manner as requests for predetermined conferees are handled. The connection to the dialed conferee is made to one port in the second group of conference ports.

A feature of this invention relates to the provision of means whereby the address for each conferee to be associated in a conference group may be selected from a repertory of predetermined conferee addresses.

Another feature of this invention relates to the provision of means which is alternatively controllable either to extract a selected address from a repertory of predetermined addresses or to accept an address signaled by the originator.

Another feature of this invention relates to the provision of common storage means either for storage of the signaled address or for storage of the address extracted from the repertory of predetermined addresses.

Another feature of this invention relates to the means for storage of successive requests for conferees whose addresses are contained in a repertory of predetermined conferee addresses pending completion of prior requests.

Another feature of this invention relates to the provision of signal control means for notifying the originator that prior requests are processed and ad-lib requests may be placed.

Another feature of this invention relates to provision of automatic conferencing means which may be activated to cause a series of connections to be made to predetermined conferees in response to signals individual to each required conferee.

The foregoing and other objects and features of this invention may be more readily understood from the following description when read with reference to the drawing, in which:

FIG. 10 (same sheet as FIG. 2) shows the manner in which FIGS. 3 through FIG. 8 are to be arranged.

Figure 1:
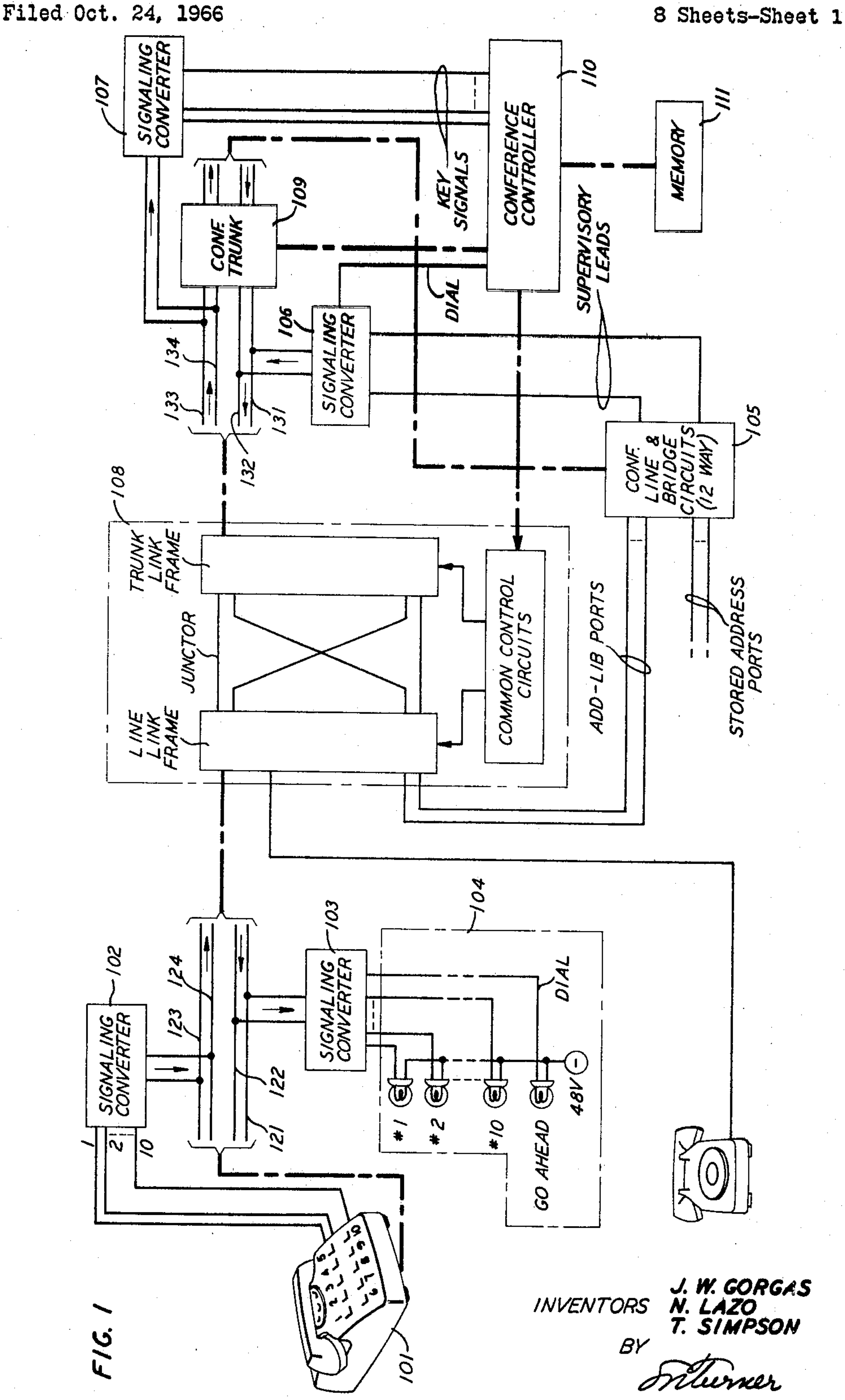
FIG. 1 shows a block diagram illustrating one manner in which the invention may be arranged in conjunction with a known switching system and also illustrating the relationship between various elements of an automatic conferencing system.

FIG. 1 shows in block diagram representation the various parts which make up the four-wire conferencing arrangement chosen to illustrate this invention. This conference arrangement is suitable for interconnecting eleven subscribers which includes the conference originator. Station 101 shown in the upper left-hand side of FIG. 1 is arranged to initiate the conference call. This four-wire station is connected to the line link frame of switching system 108 by conductors 121, 122, 123, and 124. Conductors 121 and 122 are paired and represent the "receive" channel for station 101. Conductors 123 and 124 which are also paired conductors represent the "transmit" channel for station 101. Station 101 has ten keys built into the base of the station set. The output of these keys is connected to signaling converter 102. Signaling convertor 102, which is to be described more fully hereinafter, transforms the D.C. signal generated by a key operation into frequency signals which are suitable for transmission over the "transmit" conductors.

Station 101 also includes lamp field 104. These lamps are controlled by signaling converter 103, and will be described more fully hereinafter. Lamp field 104 provides the supervisory status lamps for each conferee and the instruction lamp designated "GO-AHEAD."

As shown in FIG. 1 the conference line and bridge circuit 105 (twelve-way) may be of any suitable type which permits two-way communication between the appropriate channels of all of the lines or channels connected thereto. Thus transmission may be received on any one of the channels and transmitted to all other channels. This conference bridge may include amplifiers and various forms of echo suppressing devices. Typical multiway conference connection circuits are shown in United States Patent No. 2,019,603, issued Nov. 5, 1935, to C. W. Green; and Patent No. 2,035,536, issued Mar. 31, 1936, to F. A. Cowan et al. It is also possible to use a four-wire to two-wire hybrid or other conversion devices for each channel, thereby to convert at the bridge to a two-wire facility and thus to simplify the multiway circuit. Typical two-wire multiway conference circuits are shown in United States Patent No. 1,623,095, issued Apr. 5, 1927 to G. Crisson et al.; and Patent No. 2,154,-579 issued Apr. 18, 1939, to J. A. Parrott. When a greater number of terminals are required, two or more of the conference circuits shown in the above patents may be connected together.

Ports or terminal appearances of the conference line and bridge circuit are connected to the line terminations of the line link frame. Also each conference bridge channel is capable of supervising the conferee connected thereto and of indicating the status over supervisory leads to signaling converter 106. The operation of a channel supervisory circuit and of signaling converter 106 is discussed hereinafter. However, briefly, the D.C. status signals resulting from the operation of the channel supervisory circuit are converted by converter 106 to frequency signals which are in turn transmitted over the "transmit" (by converter 106) channel (leads 131 and 132) and switching system 108 to signaling converter 103. Therein the signals are transformed back to D.C. signals to cause the corresponding supervisory lamp in lamp field 104 to light.

Also shown in FIG. 1 is switching system 108 which is disclosed for convenience as having a line link frame, trunk link frame and common control circuit. In reality this four-wire switching system contains a variety of complex parts, but for ease in understanding this illustration this switching system is shown in a simplified form. This switching system may be of the type taught in either the following patent or pending application, the integrated two and four-wire telephone system shown in Patent No. 3,150,236 granted to J. W. Gorgas, G. A. Hurst, J. S. Pfrommer and W. H. Scheer on Sept. 22, 1964, or in private branch exchange Western Electric Company No. 758C as shown in application Ser. No. 438,182, now Patent 3,410,960 issued Nov. 12, 1968 to E. L. Erwin, A. E. Gerbore, G. C. Hobbs and H. J. Walsh. In addition a switching system capable of interconnecting two-wire circuits may be easily adapted to interconnect four-wire circuits by increasing the number of contacts closed at each crosspoint. Such arrangements are well known in the art. Some two-wire switching systems which may be adapted in this way are disclosed in the following: Patent No. 2,585,904 granted to A. J. Busch on Feb. 19, 1952, and Patent No. 2,868,884 granted to J. W. Goodenham, E. Jacobitti, O. Myers, F. F. Shipley and W. B. Strickler on Jan. 13, 1959.

In establishing a communication path through a switching system the originating conferee will dial a preassigned directory number or address code for the conference trunk. Referring to FIG. 1, such an established communication path would metallically interconnect conductors 121, 122, 123 and 124 to conductors 131, 132, 133 and 134, respectively. Thus conference trunk 109 and associated channel signaling converters 106 and 107 are interconnected with station 101 and associated channel signaling converters 102 and 103. For example, a "transmit" channel would be formed when conductors 123, 124, 133 and 134 are joined together and thus signaling converters 102 and 107 would be connected together.

In this illustration the contacts of relays will be referred to as break, make or transfer contacts. A break contact, represented by a short line drawn perpendicular to the conductor opens the conductor when the controlling relay operates. A make contact, represented by a cross formed by two short diagonal lines, closes or completes the conductor when the associated relay is operated. A transfer contact is formed by a set of break and make contacts having a common terminal and controlled by one relay.

The battery symbol used in this drawing is a dashed line enclosed by a circle. This symbol represents a connection to the negative terminal of a 48-volt battery. The positive terminal of this battery is connected to ground.

Certain groups of leads are shown for convenience as cables and are represented in the drawing by repetitive series of short and long dashed lines. When, as in FIG. 3, a make contact is shown connecting a cable in the switching system, it is to be understood that each lead in the cable is connected individually by a make contact in the manner shown for the cable.

Also, for ease in understanding this illustration, certain obvious repetitious circuits are represented by a short dashed line. For example, in the upper right-hand corner of FIG. 6 the operating circuits for relays 6MRL1 through 6MRL5 are shown in this way. It is to be understood that omitted relays 6MRL3 and 6MRL4 and their operating circuits are represented by the dashed lines and that these circuits are identical to the circuits shown for relays 6MRL1, 6MRL2 and 6MRL5.

To select a predetermined conferee address the originator depresses the key associated with the desired conferee. For convenience, assume the origintor depresses key 1 shown as the leftmost key in the upper row at station 101.

Figure 2:
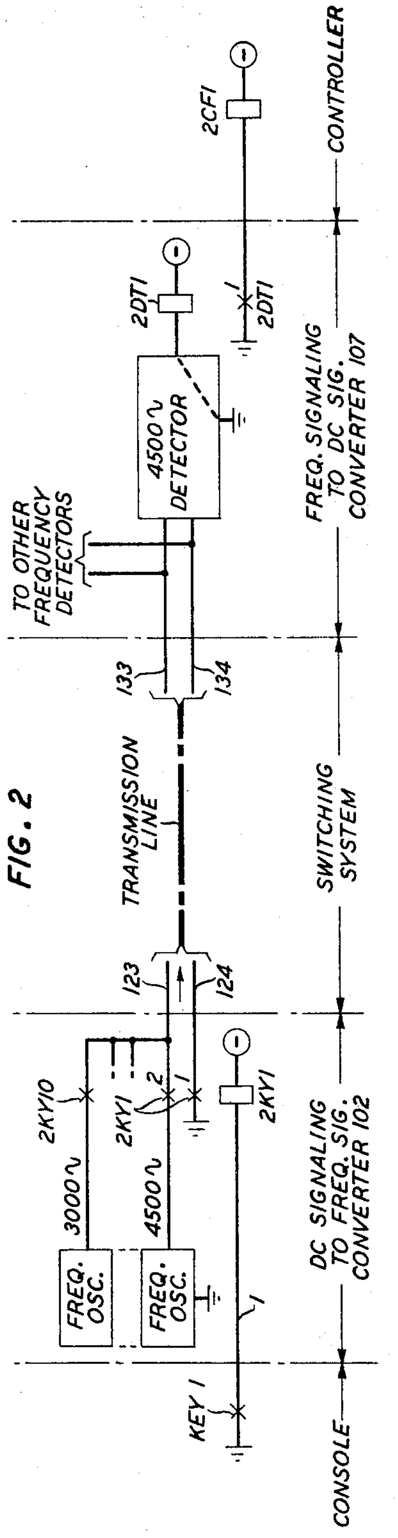
FIG. 2 shows a typical method for converting the direct current signals produced by key operation into frequency signals and also shows the conversion of these frequency signals back to direct current signals.
Figure 10:
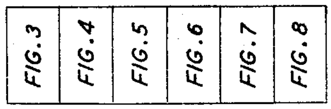

Referring now to FIG. 2, the operated contact of key 1 is schematically represented on the upper left-hand side of the sheet. FIG. 2 shows in detail what occurs in signaling converters 102 and 107 when key 1 is depressed. Following the circuit flow from left to right, operated make contact of key 1 connects ground to conductor 1 which causes relay 2KY1 to operate. Operated make contacts 1 and 2 of this relay connect ground (signal return) and 4500 cycles respectively to conductors 124 and 123. As described earlier, these conductors are connected by way of the switching systems to conductors 133 and 134, and thence to signaling converter 107. As is shown in FIG. 2 the 4500-cycle signal is detected by converter 107. Thereafter the detection means activates the 2DT1 relay by connecting a ground to one side of the winding. Operated make contact 1 of relay 2DT1 in turn connects ground to the winding of relay 2CF1 and thus the key depression at the console results in a relay operation at the controller.

The events and circuit operations which followed the operation of key 1 were representative of the operations which follow the operation of any one of keys 2 through 10, FIG. 1. In addition, this same process is applied to conductors 121, 122, 131 and 132 to transmit the supervisory signals from signaling converter 106 to control lamp field 104. Various methods can be employed to convey D.C. signals over a transmission path. Some of these methods involve frequency modulation, transmission by a series of pulses such as PCM and inband signaling using slot filtering. Herein, out-of-band signaling was chosen for convenience and ease of presentation but it should appear obvious to anyone skilled in the art that there exist various modes of signaling which could be used to accomplish the same result without departing from the spirit and scope of the invention.

Referring once again to FIG. 1, for each request received a predetermined address is extracted from memory 111 under control of conference controller 110. Memory 111 contains a prewired logic array which produces a directory number for any given key position. When an address code is received from memory 111 it is stored in conference controller 110 until switching system 108 is available to make the connection. In addition to giving to switching system 108 the selected directory number, the conference controller determines the equipment location for an idle conference port appearance in the line link frame and transmits this information together with the address code to the switching system. This process is repeated again and again until all requested conferees are connected to a conference port.

In addition to causing a connection to a conferee by selecting an address from memory, the originator may establish an "ad-lib" connection. This connection is initiated by depressing one of the special ad-lib keys provided at station 101.

The keys at station 101 are separated operationally into two groups. The first group, consisting of keys 1 through 5, are reserved for repertory selection. The second group consisting of keys 6 through 10 are associated with ad-lib selection. For convenience in this presentation five keys are shown in each group. However, in practice there may be a greater operability of keys and the number of keys in each group may be provided in a different ratio one to another. Further, it will become apparent as the detailed disclosure unfolds that a greater plurality of keys could be provided by one skilled in the art without departing from the spirit and scope of this invention.

Depressing key 6, for example, alerts the conference controller to an ad-lib connection. The signal from key 6 is converted twice, once from a D.C. signal to a frequency signal by converter 102 and a second time converted back to a D.C. signal by converter 107. This latter signal is transmitted to conference controller 110. When controller 110 is prepared to handle the request, this circuit transmits a signal toward the originator. This signal is conveyed over the "transmit" channel as discussed elsewhere, and converted by signaling converter 103 to a D.C. signal. This D.C. signal lights the GO-AHEAD lamp in lamp field 104.

The GO-AHEAD lamp functions similar to the dial tone signal transmitted to a subscriber who has removed his handset from the instrument cradle. The lamp signal informs the originator that the controller is ready to accept the dial pulse signals. Upon receipt of a full directory number the conference controller determines the equipment location of an idle port on the conference line and bridge circuit. This selected port corresponds to the key number depressed in order that the supervisory signals from this conferee may appear on the proper lamp. Details of this relationship and the circuitry used to accomplish this will be discussed hereinafter. Thereafter switching system 108 establishes a connection between the requested conferee and the selected port of the conference line and bridge circuit.

As stated above, the originator transmits dial pulse signals to the conference controller. However, it is well known that a rotary dial may be replaced by a frequency transmitter. Two of such transmitters which are commonly used today are identified as TOUCH-TONE and multifrequency signaling transmitters. Further, compatible frequency detection apparatus well known in the art may replace the dial pulse detection apparatus. Thus, the mode of signaling the directory number may be converted from dial pulse signaling to frequency signaling by one skilled in the art without departing from the spirit and scope of this invention.

The two modes of selecting conferees just described may be used in any order. The only restriction refers to "ad-lib" connections which cannot be started without the GO-AHEAD lamp signal. In general, the controller will process all requests which involve selecting a predetermined address from memory before lighting the GO-AHEAD lamp. However, once preference is given to an ad-lib connection, that preference is maintained until the connection is established or a busy condition is determined.

Call blockage conditions such as all links busy and line busy conditions cause the controller to retry the connection. During the recycle which puts the controller back in a condition to start the call again, other requests are given an opportunity to be preferred over the call just priorly tried. This preference arrangement is fully described herein after under detailed description.

DETAILED DESCRIPTION (GENERAL)

Figure 3:
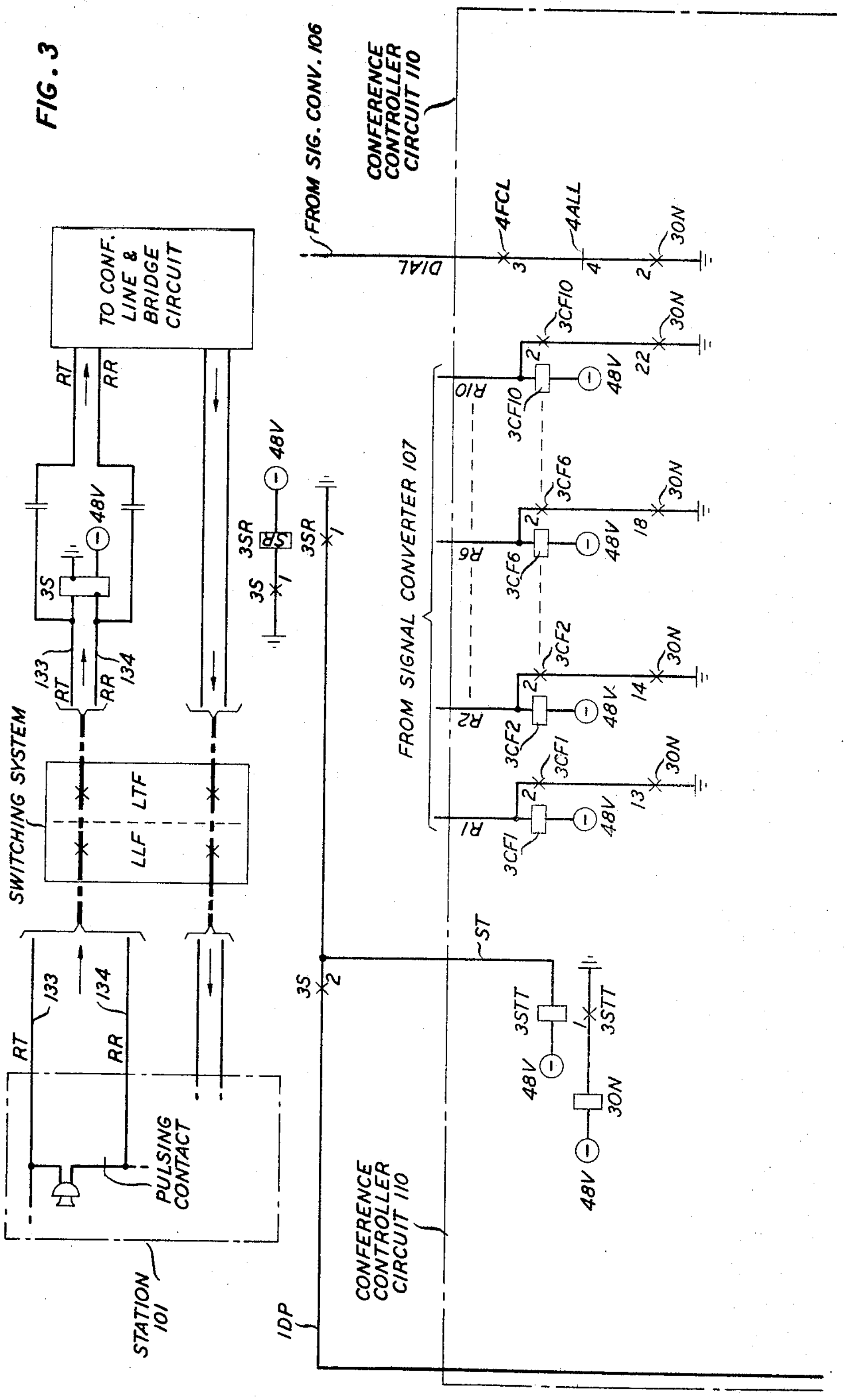
FIG. 3 shows a conference trunk in accordance with this invention for receiving the "ad-lib" requests.

FIG. 3 shows in part a conference trunk circuit. This trunk circuit is the one identified in FIG. 1 as conference trunk 109. A connection to this circuit is necessary to begin the automatic conferencing or to establish an ad-lib connection.

The conference trunk is connected to the trunk link frame in switching system 108 thereby making this circuit available to the subscribers of the same switching system. This trunk is also connected to a port of the conference line and bridge circuit. This latter connection enables the subscriber connected to this trunk by way of the trunk line frame to communicate with the conferees connected to the line and bridge circuit.

When it is desired to make a conference call the subscriber at station 101 will initiate a call by removing the instrument from its support; this causes a signal to be transmitted to the central office equipment 108 shown in FIG. 1. In a normal manner thereafter the common control circuits cause a connection to be established from the subscriber's station line over the transmission path or junctor and through the line link frame and trunk link frame to an originating register (not shown). Inasmuch as the operation of the system at this time is substantially as described in the above-identified patents, the operation of all the detailed circuits is not repeated herein.

When the subscriber at station 101 receives dial tone, he may dial the identifying code of conference trunk 109. This code will then be entered in the originating register. When the complete code or a sufficient portion thereof has been registered, the originating register will again call in the common control and cause a connection to be established between conference trunk 109 and station 101.

Referring now to FIG. 3, a connection between station 101 and the conference trunk causes relay 3S to operate. The operate path of relay 3S may be traced from ground which is connected to the right-hand side of the upper winding and thence through the winding to lead RT which is in turn connected to the trunk link frame. Lead RT was previously identified in FIG. 1 as lead 133. Lead RT thereafter follows a well known path through the switching system to the line link frame and thence to the telephone circuit of station 101. The telephone circuit, part of station 101, connects leads RT and RR together through a pulsing contact of the dial and the carbon microphone. Since the pulsing contact is normally closed and the microphone resistance is approximately 100 ohms, the subscriber loop is effectively closed. Lead RR may be traced through the line link frame and trunk link frame to the left-hand side of the lower winding of relay 3S and thence through the winding to battery. Since the current in the path or loop just traced flows into the inner ends of both the upper and lower windings and the windings are accordingly arranged in a series aiding configuration, relay 3S operates.

Make contact 1 of relay 3S closes ground to one end of the 3SR relay winding. Since the other end of the winding is connected to battery, relay 3SR operates. Relay 3SR is equipped with either a copper or an aluminum sleeve over the winding core to produce a slow-releasing relay. This arrangement is used to prevent the false release of relay 3SR during intermittent breaks in the loop circuit holding relay 3S. The importance of this arrangement will become apparent from the details of dialing a conferee number on an ad-lib connection.

Lead IDP is grounded by a path which includes make contact 1 of relay 3SR and make contact 2 of relay 3S. This ground may be traced over lead IDP from FIG. 3 to FIG. 4 and thence to FIG. 5 wherein a path is prepared to operate relay 5L on its upper winding. Make contact 1 of relay 3SR is also part of the operating path of relay 3STT which is shown on FIG. 3 as part of the conference controller circuit. Thus operated make contact 1 of relay 3SR grounds leads ST to operate relay 3STT by grounding one side of the winding, the other side being already connected to battery. Make contact 1 of relay 3STT grounds one side of the winding of relay 3ON thus causing relay 3ON to operate.

Relay 3ON provides the fundamental ground to the vital circuit of the conference controller circuit thereby making this circuit sensitive to key operations which are to be discussed subsequently. Also make contact 2 of relay 3ON prepares a path to ground lead DIAL (see FIGS. 1 and 3).

SELECTION OF PREDETERMINED CONFEREE

The originator may chose either one of two basic methods to select a conferee. The first method would be initiated by selecting any one of five predetermined conferees and by depressing the particular key associated therewith located along the top row of keys shown on FIG. 1 at station 101. These keys are designated 1 through 5. The second method is initiated by depressing any one of the five keys shown as the bottom row of keys at station 101 and designated 6 through 10. This latter method is used when the desired conferee is not numbered among the predetermined conferees. For purposes of this description, it is assumed the originator will depress key 1 and key 2 to connect two of the five predetermined conferees and depress key 6 to add a conferee "ad-lib."

In the contemplated system the originator may depress keys 1 through 5 all at once or one at a time. For purposes of discussion let us assume the originator depressed keys 1 and 2 nearly simultaneously to create the most adverse situation. As discussed elsewhere these key signals are converted twice, once by converter 102 and again by converter 107. The result of this operation grounds two of the leads shown in FIG. 1 interconnecting signaling converter 107 and the conference controller 110. These leads are identified on FIG. 1 by the notation "KEY SIGNALS."

Referring now to FIG. 3 and to that portion of the figure identified by dashed lines as the conference controller circuit, leads R1 and R2 are grounded by the action of the signal converter described above. Since both relays 3CF1 and 3CF2 have battery connected to one side of their windings the ground on leads R1 and R2 cause relays 3CF1 and 3CF2 respectively to operate.

Figure 4:
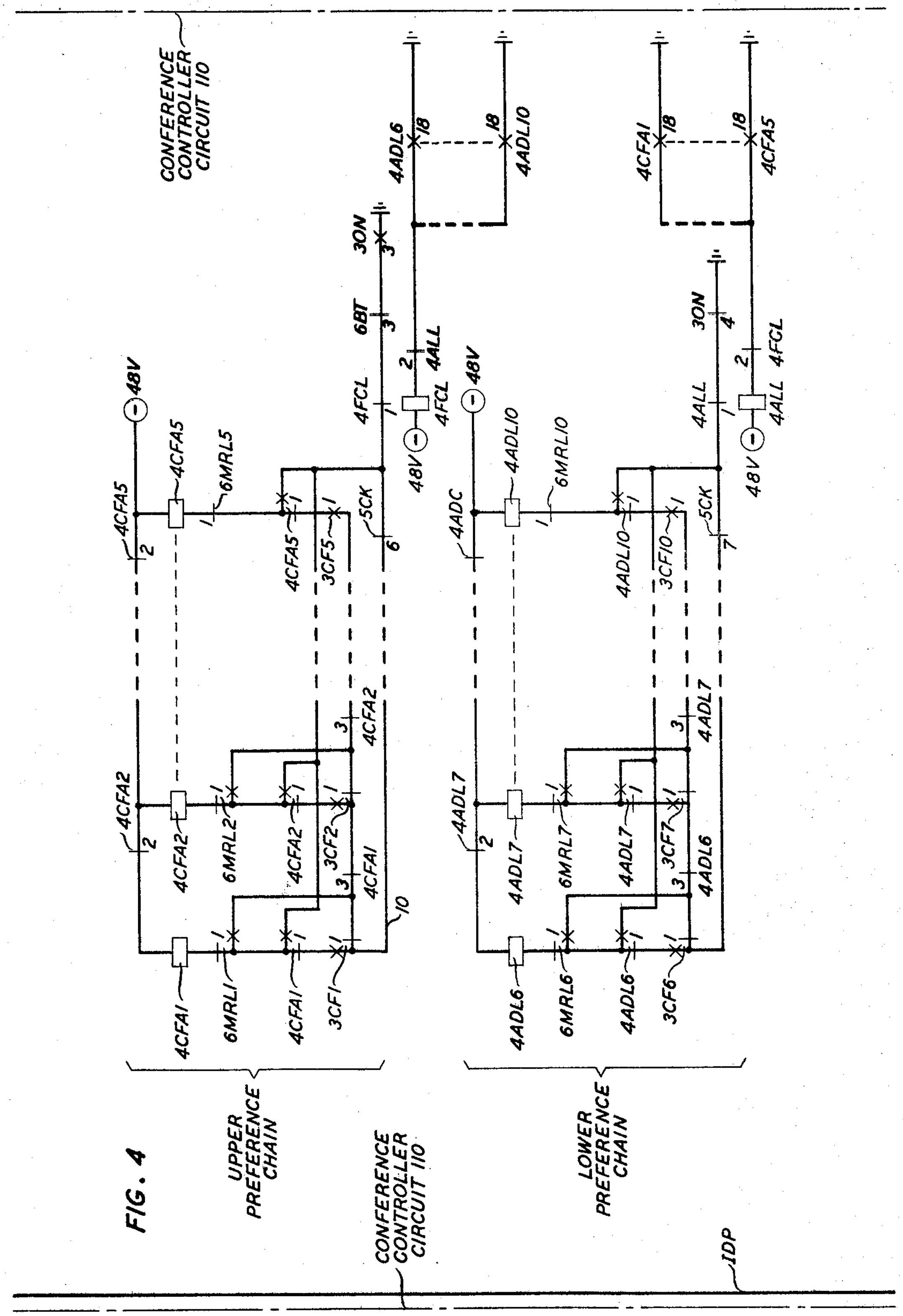
FIG. 4 shows a portion of the conference controller circuit concerned with preference control of key requests.

FIG. 4 shows two independent double work chains. These circuits are also identified by the more general title of preference lockout circuits. The upper preference circuit is controlled by the operation of relays 3CF1 through 3CF5. Lockout circuits are well known in the art as demonstrated by the text entitled, "The Design of Switching Circuits," by W. Keister, A. E. Ritchie and S. H. Washburn, first edition, chapter 15. Thus a detailed explanation of the working of a lockout chain is not warranted here as it is thoroughly developed in the above text. Since the operation of transfer contact 1 of relay 3CF1 opens the operating path of relays 4CFA2 through 4CFA5, the operation of make contact 1 of relay 3CF2 has no effect at this time. Make contact 1 of relay 3CF1 closes ground from conductor 10 through non-operated break contact 1 of relay 4CFA1 and nonoperated break contact 1 of relay 6MRL1 to the winding relay 4CFA1. Battery is connected through break contact 2 of relay 4CFA5 and through a series chain of break contacts of intermediate relays 4CFA4 and 4CFA3 and thence through break contact 2 of relay 4CFA2 to the opposite winding terminal of relay 4CFA1 thus causing that relay to operate. Make contact of transfer contact 1 on relay 4CFA1 provides a holding ground which shunts make contact 1 of relay 3CF1. The break contact associated with transfer contact 1 on relay 4CFA1 opens a portion of the operating path for relay 4CFA1 but this relay is held operated at this time as described above. In addition, break contact 3 of relay 4CFA1 opens the ground operating path for relays 4CFA2 through 4CFA5 to insure that these relays will not operate and thereby interfere with the operations to be described.

Figure 6:
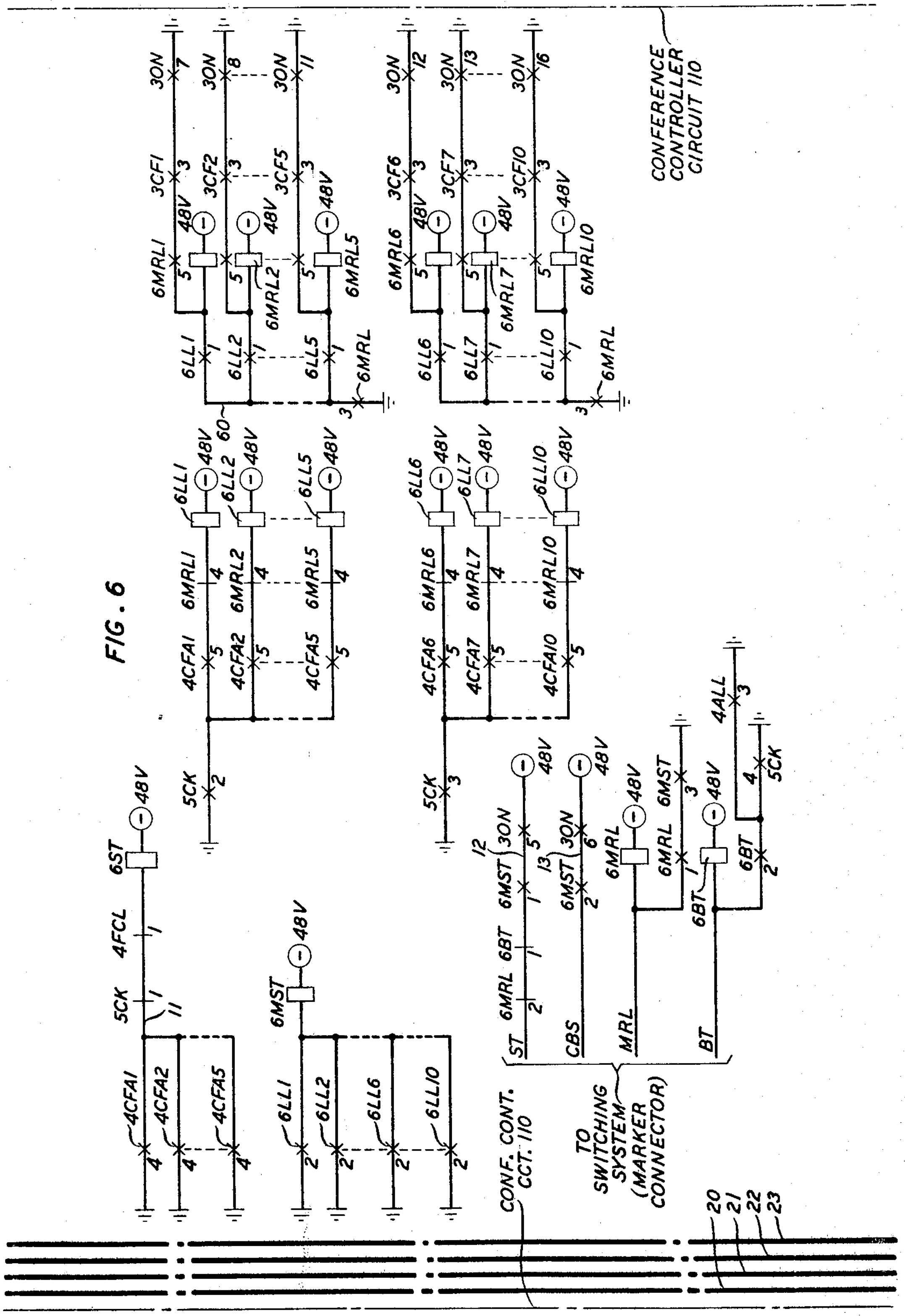
FIG. 6 shows a portion of the conference controller circuit concerned with signaling the switching system to begin processing an address stored in memory; this figure also concerns advancing to the next key request when a prior request is completed.

Referring now to FIG. 6, make contact 4 of relay 4CFA1 connects ground to conductor 11. Since relays 5CK and 4FCL are not operated at this time, ground on conductor 11 is connected through nonoperated break contacts 1 of these relays to the winding of relay 6ST thereby to cause this relay to operate. Operation of relay 6ST signifies the beginning of the process of extracting from memory an address which is stored therein.

Let us defer momentarily the removal of an address from memory to discuss the basic theory behind the circuits shown in FIG. 6. Relays 6LL– and 6MRL– form a logic and memory circuit to record the successfully completion of a key request by common control. Contacts of these circuits also cause the conference controller circuit to advance to the next request. This circuit operates in two steps the first of which occurs when any 4CF– relay operates. The second occurs after the common control has successfully completed a connection to the requested conferee.

Referring to FIG. 6, ground through make contact 2 of relay 5CK is connected by make contact 5 of relay 4CFA1 through break contact 4 of relay 6MRL1 to relay 6LL1 thereby operating this relay. The operation of relay 5CK will be discussed subsequently. Briefly, however, relay 5CK operates when a conferee adress is stored in the controller. As mentioned above, the operation of relay 6LL1 consitutes the first step of the two-step operation. Similar operating paths are shown for the remaining 6LL– relays none of which are operated at this time.

As a result of the above sequence, relay 6MST, shown in FIG. 6, is operated at this time by make contact 2 of relay 6LL1. Relay 6MST closes two circuits with make contacts 1 and 2 and prepares a locking circuit for relay 6MRL with make contact 3. It will be recalled that relay 3ON operated priorly in response to a connection to the conference trunk. Thus make contacts 5 and 6 of relay 3ON provide battery to conductors 12 and 13 respectively. These potentials are extended to the switching system by make contacts 1 and 2 respectively of relay 6MST over leads ST and CBS. The battery circuit extended over lead ST also included break contact 2 of relay 6MRL and break contact 1 of relay 6BT both of which are nonoperated at this time. Subsequently, one of these contacts will open lead ST thereby removing the "start" indication.

Before proceeding with the details of the effects of the operation of relay 6MST upon the switching system it is best at this point to view this operation broadly. The conference controller circuit will on every connection to the switching system have priorly stored the called directory number and the equipment location of the conference port appearance in the line link frame. Therefore this circuit appears to a marker in a switching system as a register circuit appears during an originating connection. In other words the controller circuit connects in a switching system in the same electrical position that an originating register circuit would connect. Necessary switching functions which are performed by a register in a system like those described in the above patent and pending application are accomplished in the instant system over leads ST, CBS, MRL and BT. These lead designations are abbreviations of the actual functions performed by the switching system. Each lead designation is listed below and associated with a fuller description of the circuit operation.

ST—START; This signal requests a connection to the marker for completion of a particular call.

CBS—CONNECTOR BATTERY SUPPLY; this circuit provides the connector battery.

MRL—MARKER RELEASE; unlike the above signals which are sent *to* the marker, this one is sent by the marker when the call has been established.

BT—BUSY TONE; like the MRL signal, this one is sent by the marker when the call cannot be completed because of a blockage or line busy condition.

Thus the operation of relay 6MST described above provides the battery potential over lead CBS necessary to the operation of the marker circuit connector and provides a signal over lead ST to cause the marker to begin its operation. A part from these operations make contact 3 of relay 6MST prepares a locking path for relay 6MRL as shown in FIG. 6.

Figure 5:
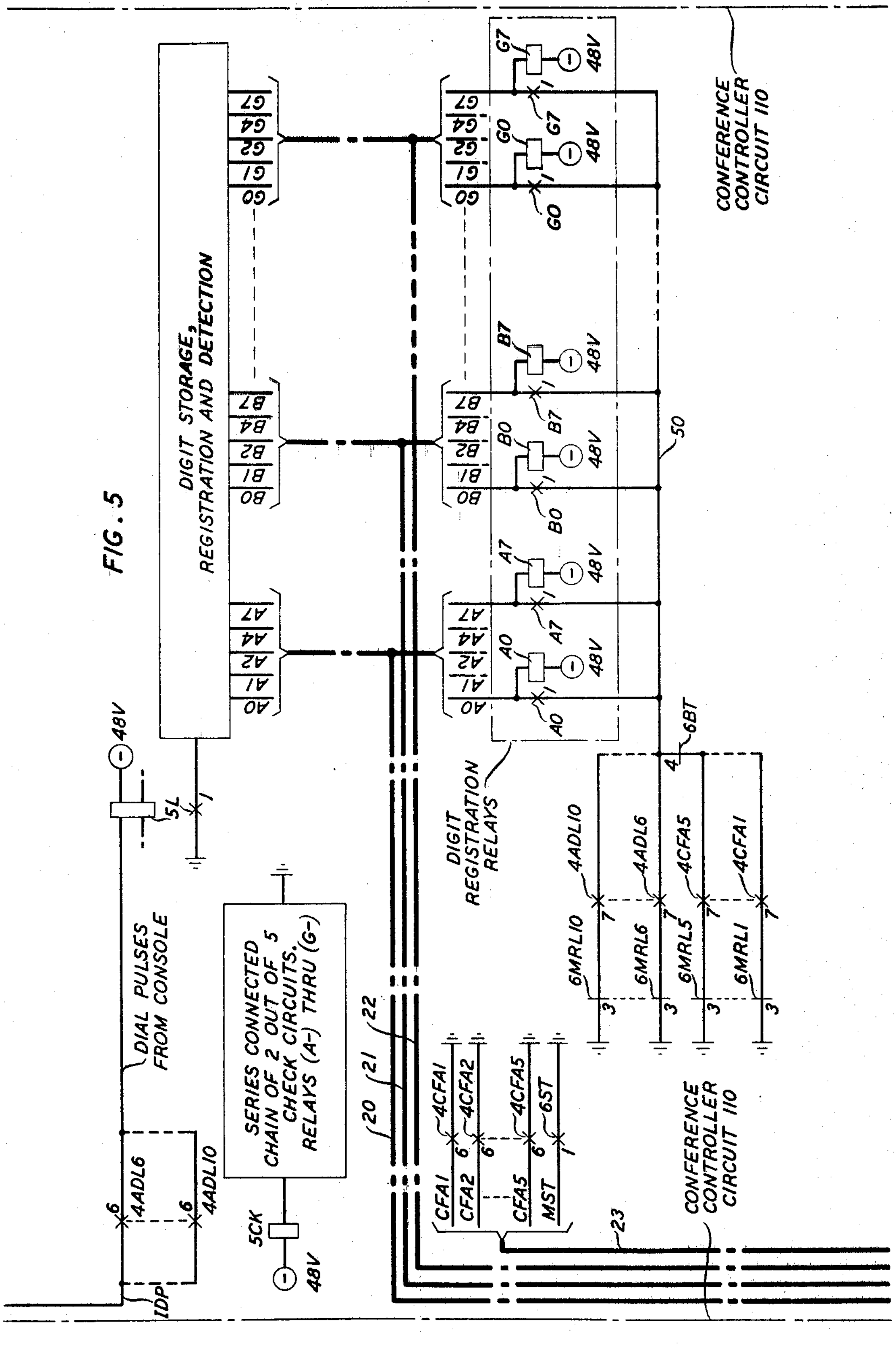
FIG. 5 shows a portion of the conference controller circuit concerned with the common storage of originator signaled addresses and of addresses extracted from a repertory of predetermined addresses.

Returning to the selection of an address from memory initiated by the operation of relay 6ST, make contact 1 of that relay as shown on FIG. 5 connects ground onto lead MST. Lead MST may be traced via cable 23 through FIG. 6 and FIG. 7 to FIG. 8 wherein the ground on lead MST operates relay 8BGN. FIG. 8 depicts the memory of stored predetermined addresses.

In FIG. 8 a cross-connecting field is represented which has a plurality of vertical colums one for each digit of the stored address and a plurality of horizontal lines or conductors each one of which represents one code element of a two-out-of-five code employed to represent each of the various numbers stored in this location. The black dots represent cross-connections between the vertical line and the horizontal output terminals. A combination of operated make contacts of relays 8BGN and 8M– is employed to select one of the various codes or numbers stored in this cross-connection field. FIG. 8 shows seven columns for determining a seven-digit directory number. Today the telephone network has expanded to require the use of three additional numbers to describe a telephone subscriber anywhere in the United States. This area code, as it is termed, may be generated by the register field shown in FIG. 8 simply by expanding the total number of vertical columns to ten. Accordingly, the field could be expanded to accommodate any size address code which may be required.

It will be recalled that priorly relay 4CFA1 was operated. Thus make contact 6 of that relay shown in FIG. 5 grounds lead CFA1. Lead CFA1 may be traced via cable 23 from FIG. 5 to FIG. 8 wherein the ground signal on lead CFA1 operates relay 8MA. As discussed generally above, contacts of relays 8BGN and 8MA combine to select a seven-digit directory number. For example, the second digit of the address selected under these circumstances may be traced as follows. Make contact 1 of relay 8BGN grounds conductor 14. Also make contacts 2 through 5 round conductors 15 through 18. However, since only relay 8MA is operated at this time only the ground on conductor 14 is effective. Make contact 1 of relay 8MA connects ground to the cross-connection field for the second digit. From FIG. 8 it is apparent that the vertical column is cross connectable to the horizontal rows to reproduce a two-out-of-five code which in this instance is rows 0 and 2. Make contact 9 or relay 8MA extends the ground cross connected to horizontal row 0 to horizontal row 2.

Therefore the second digit developed by the cross-connection field and translated to a decimal code is the number 2. Similar paths may be traced through the remainder of the cross-connection field to develop the address of the predetermined conferee associated with relay CFA1 and thus with key 1 at station 101. In this instance the full directory address is 923–2412.

When one digit of the address is common in all the stored addresses the cross-connection can be handled in a more simplified manner. This situation is shown for the first stored digit of all addresses.

The address determined above is transmitted from FIG. 8 to FIG. 5 by way of cables 20, 21, 22 and intermediate cables. For example the first digit of the address, 9, is represented by ground on horizontal rows 2 and 7 and by the absence of ground on horizontal rows 0, 1 and 4. These five row signals appearing on leads A0, 1 2, 4 and 7 are connected by way of multilead cable 20 with relays A0, A1, A2, A4 and A7 shown In FIG. 5. In FIG. 5 relays A0 and A7 are representative of the five relays in that group. Similarly, the second digit, indicated by a ground signal on horizontal rows 0 and 2, is transported by cable 21 to relays B0, B1, B2, B4 and B7. All intermediate digits are handled in a similar way. The last digit is carried on cable 22 to relays G0, G1, G2, G4 and G7.

As stated above, the predetermined address is conveyed by way of cables 20, 21 and 22 and four other like cables to the digit registration relays A– through G. Each operated registration relay locks up over a path which includes an operated make contact of that relay to conductor 50 as shown in FIG. 5. Conductor 50 is connected to ground by break contact 3 of relay 6MRL1, through make contact 7 of relay 4CFA1 and through break contact 4 of relay 6BT. Thus each operated registration relay locks up over a path independent of its operating path.

The operating path of relay 5CK also shown in FIG. 5 consists of a series connected chain of two-out-of-five check circuits, the last one of which is connected to ground. Two-out-of-five check circuits are well known in the art as evidenced in chapter 19 of the text mentioned above entitled, "The Design of Switching Circuits." In that chapter, figure 19–2A depicts such a check circuit. If seven of such check circuits are connected end to end, the last one connected to relay 5CK and the first one of the chain connected to ground, the operating circuit for relay 5CK would be complete.

Therefore when two relays in each digit registration group are operated, ground is connected to the winding of relay 5CK thereby causing that relay to operate.

Operation of relay 5CK signifies the end of the predetermined digit selection and also signifies the beginning of the common control system operation. This latter operation was described in detail priorly under the discussion concerning contacts 2 and 3 of relay 5CK shown in FIG. 6.

Operation of relay 5CK causes break contact 1 associated with that relay to open the operating circuit of relay 6ST shown on FIG. 6. The resulting release of relay 6ST removes the ground from lead MST shown in FIG. 5 thereby releasing relay 8BGN in the memory of FIG. 8. It will be recalled that relay 8BGN controlled the fundamental ground to the cross-connection field and therefore with the release of this relay 8BGN the operating path for the digit registration relays of FIG. 5 is also opened. As mentioned earlier, these registration relays are provided with a locking circuit to insure that they will remain operated at this time.

Figure 7:
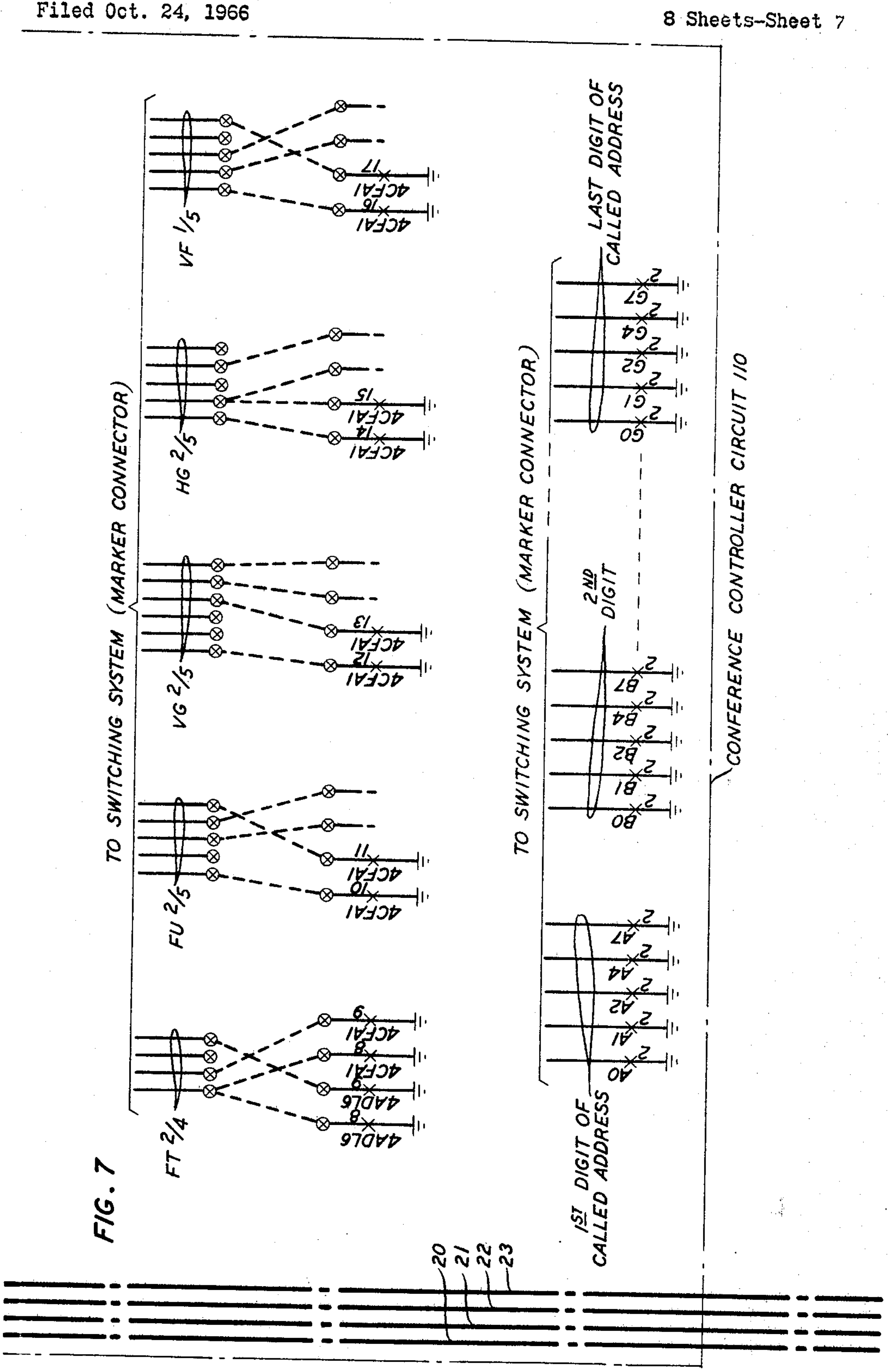
FIG. 7 shows a portion of the conference controller circuit which describes the method of determining the equipment location of a conference port.
Figure 8:
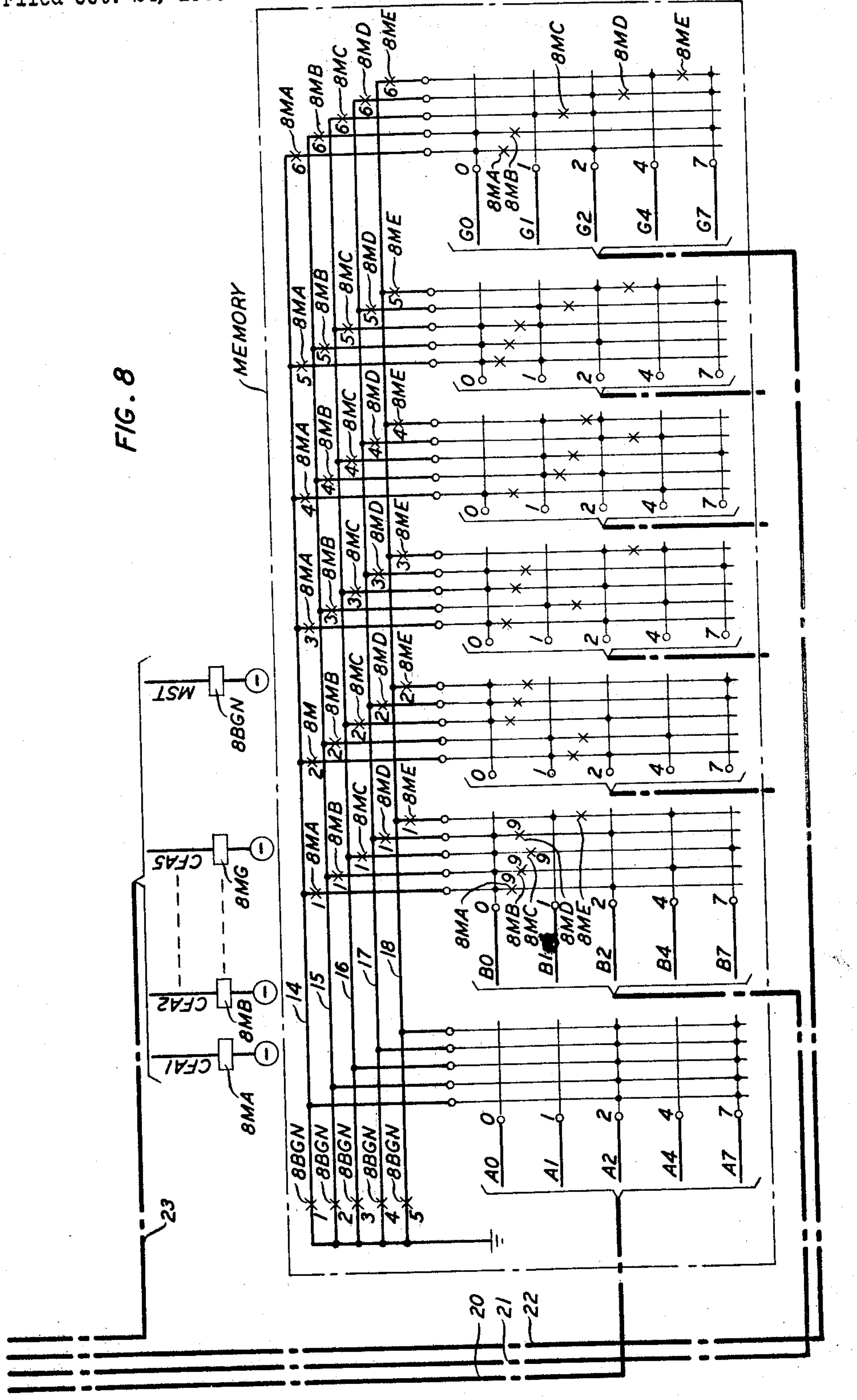
FIG. 8 shows the memory for storing a repertory of predetermined addresses.

FIG. 7 shows a circuit for transmitting both the selected directory number described above and the equipment location of an idle conference port. This figure employs an obvious circuit consisting of digit registration relay contacts to transmit the called conferee number. However, the terminal location or equipment location of the conference port necessary to complete the connection has not been discussed priorly.

Shown in the upper portion of FIG. 7 is a plurality of cross-connections which must be made for each key position. FIG. 7 only shows an abbreviated form of the actual field which might be used in practice. However, all necessary cross-connections have been made for key 1 thereby to show the procedure which is duplicated time and time again for each of the other key positions. It will be recalled that relay 4CFA1 was operated priorly in response to the operation of key 1. As shown in FIG. 7, two make contacts of this relay are associated with each one of the five groups of cross-connect fields. The required information varies from switching system to switching system. As an example, the leads necessary to the operation of the switching system of the aforementioned Patent 3,150,236 are shown herein. The other systems mentioned above may be handled in a similar manner.

The common control marker which processes this request will indicate at the completion of connection that the call is satisfactorily completed, or has been blocked by an event such as line busy or link busy. The former is indicated by a ground on lead MRL which in turn operates relay 6MRL shown on FIG. 6, and the latter condition is indicated by a ground signal on lead BT which operates relay 6BT. The circuit operation following the operation of relay 6BT will be reserved for a subsequent discussion.

As shown in FIG. 6 relay 6MRL, if operated, is locked operated by make contact 1 of the same relay and make contact 3 of relay 6MST. It will be recalled that relay MST is operated at this time. Break contact 2 of relay 6MRL in FIG. 6 opens the ST lead to the switching system thereby signaling that circuit to release. In addition, make contact 3 of relay 6MRL also shown in FIG. 6 connects ground to conductor 60 thereby preparing the operate circuit for relay 6MRL1. It will be recalled that relay 6LL1 was priorly operated and thus make contact 1 of this relay connects the ground on conductor 60 to the winding of relay 6MRL1 thereby operating this relay. Relay 6MRL1 is locked operated by make contact 5 of the same relay through make contact 3 of relay 3CF1 and then through make contact 7 of relay 3ON which is in turn connected to ground. Similar operating paths are shown for relays 6MRL2 through 6MRL10 which respond to the operation of keys 2 through 10 respectively.

Operation of relay 6MRL1 signifies the successful completion of a connection between the selected conferee and the selected conferee port of the conference line and bridge circuit. This relay operation also advances the preference chain shown in FIG. 4 preparatory to the next connection.

It will be recalled that keys 1 and 2 and 6 were depressed by the originator conferee and following these key operations relays 3CF1, 3CF2 and 3CF6 shown on FIG. 3 were operated and subsequently locked through the make contacts 13, 14 and 18 respectively of relay 3ON to ground. Referring to FIG. 4, relay 4ALL is operated by make contact 18 of relay 4CFA1 through a break contact of relay 4FCL which is not operated at this time. It should be noted that break contact 2 of relay 4ALL prevents the operation of relay 4FCL. Also break contact 1 of relay 4ALL opens the fundamental ground circuit for lower preference chain (FIG. 4).

As shown on FIG. 4, transfer contact 1 of relay 6MRL1 opens the operating circuit of relay 4CFA1 and connects ground to relay 4CFA2. When relay 4CFA1 is released a path may be traced to extend the ground on conductor 10 through make contact 1 of relay 3CF1, break contact 1 of relay 4CFA1, make contact 1 of relay 6MRL1, break contact 3 of relay 4CFA1 and thence through a similar operating circuit as discussed earlier to operate relay 4CFA2. Relay 4ALL, priorly operated by make contact 18 of relay 4CFA1 is reoperated by a same number make contact on relay 4CFA2. During the prior operation relay 4ALL break contact 1 prevented a race condition from developing between the two preference chains by giving preference to the upper preference circuit.

During the time the above action was taking place but before the 4CFA2 relay operated, break contact 3 of relay 6MRL1 shown on FIG. 5 opened the holding circuit for the digit registration relays. When at least one of these relays has released relay 5CK is in turn released. Referring to FIG. 6, break contact 1 of relay 5CK completes a portion of the operating circuit of relay 6ST. Therefore the operation of relay 4CFA2 will begin once again the operating cycle just described for relay 4CFA1 resulting in the selection and connection of another predetermined conferee.

On occasion a connection cannot be established because the called line is busy or because links necessary to this connection are busy. When this occurs the marker circuit in the switching system grounds the BT lead shown in FIG. 6. This lead is grounded instead of the MRL lead which has been priorly discussed. This ground signal operates relay 6BT which in turn locks operated to a local circuit. This local circuit consists of make contact 2 of relay 6BT in series with a parallel set of make contacts, make contact 3 of relay 4ALL and make contact 4 of relay 5CK.

Contacts of relay 6BT are positioned to restore the controller to normal and to allow new starts as from new key depressions to replace the call just priorly processed. However, if there are no new calls, the one just attempted is tried again.

As shown in FIG. 6 break contact 1 of relay 6BT opens the lead ST to the switching system thereby to signal the marker circuit that the controller is withdrawing the request. Referring to FIG. 4, break contact 3 of relay 6BT opens the ground circuit, both for holding and operating preference relays, thereby releasing the operated 4CFA– relay. When the operated 4CFA– relay is released, relay 4ALL is released.

Finally, break contact 4 of relay 6BT as shown in FIG. 5 opens the holding circuit for the digit registration relays. As a result these relays are released and in turn relay 5CK is released. Recalling that relay 6BT was locked up to make contacts on relays 4ALL and 5CK, the operation described above therefore results in the release of relay 6BT. At this time the controller is resorted to normal and prepared to accept another request or process the same request again.

Whether the same request priorly handled will be preferred over other requests is determined by the preference chain shown in FIG. 4.

SELECTION OF AD-LIB CONFEREE

As mentioned earlier, a conferee may be added to a conference group without first having his address code stored in memory. The procedure followed is termed adding a conferee "ad-lib" and the conferee added in this manner is called an "ad-lib" conferee. As viewed by the conference originator the procedure is quite simple.

In brief, the originator depresses an ad-lib key and awaits a signal on the GO-AHEAD lamp. When this lamp lights the originator dials the address of the conferee. This address is repeated by the conference trunk circuit to the controller circuit. The controller stores the address on the same digit registration relays used to store the predetermined address described earlier. The procedure followed thereafter is similar to that followed by the switching system and controller as described in the preselected conferee connection.

It will be recalled from the opening remarks of the detailed description that the originator had depressed key 6 in addition to keys 1 and 2. The prior descriptions detained the controller operation in handling the requests originated by keys 1 and 2. Assume at this time that the second request has been successfully completed and that the controller is about to set up for the ad-lib connection requested by key 6.

At the completion of the second request, as discussed earlier relay 4CFA2 is released thereby releasing relay 4ALL shown in FIG. 4. In FIG. 3, break contact 4 of relay 4ALL connects the ground provided by make contact 2 of relay 3ON to make contact 3 of relay 4FCL which in turn extends the ground to lead DIAL. This ground signal controls the GO-AHEAD lamp which lights in response to the signal.

Lead DIA Lis connected to signalling converter 106 shown on FIG. 1. As discussed elsewhere, signaling converter 106 converts the ground signal on this lead into a frequency signal and transmits this freqeuncy signal to signaling converter 103. Signaling converter 103 reconverts the received frequency signal into a ground signal which in this instance grounds lead DIAL to light the GO-AHEAD lamp.

In FIG. 4 the lower preference chain circuit is analogous in every respect to the upper preference circuit. The upper preference circuit for operation of keys 1 through 5 was discussed priorly and since this circuit operation is also discussed in the text entitled, "The Design of Switching Circuits," a duplicate discussion of the detail workings of the lower preference chain is not warranted. Therefore, briefly, relay 4ADL6 operates in response to the operation of make contact 1 on relay 3CF6. Also shown on FIG. 4, operation of relay 4ADL6 closes make contact 18 of the same relay thereby operating relay 4FCL. Thereafter break contact 2 of relay 4FCL opens the operating path for relay 4ALL thereby giving subsequent ad-lib reqeusts preference over subsequent predetermined address requests.

When the above circuit sequence is complete, the controller is prepared and the originator is signaled by the GO-AHEAD lamp to proceed to dial pulse the conferee address. The originator's dial pulsing contacts are connected in series with the transmit loop which was discussed earlier in connection with the initial operation of relay 3S of FIG. 3. For each pulse representing a digit the loop is opened momentarily causing relay 3S shown in FIG. 3 to release and to reoperate. However, even though make contact 1 of relay 3S is interrupting the operating circuit of relay 3SR of FIG. 3, relay 3SR remains operated over the dial pulsing interval. As explained earlier, relay 3SR has a slow-release characteristic and thus the holding circuit for relay 3ON of FIG. 3 is maintained.

Make contact 2 of relay 3S pulses lead IDP in FIG. 3 in synchronism with the incoming dial pulses. These ground pulses on lead IDP may be traced from FIG. 3, through FIG. 4 and into FIG. 5 wherein lead IDP is connected by make contact 6 of relay ADL6 to the upper winding of relay 5L. Therefore similar to the L relay which operates in the register circuits of various switching systems, the 5L relay make contact 1 pulses a digit storage, registration and detection circuit. The operation of a digit storage, registration and detection circuit is well known and is not shown in detail herein. One example of such a circuit operation is described in Patent No. 2,585,904 supra, beginning with column 62, line 15, et seq. This patent is by this reference made a part of this disclosure as if fully disclosed herein. Further, as is shown in the drawing, it is well known to convert the decimal output of a register into a two-out-of-five code.

After all digits are detected and registered as described in the Busch patent, the determined address is transmitted via the A– through G– leads to the digit registration relays and stored therein. Each operated registration relay is held operated through a make contact 1 of the operated relay and thence to a common path which includes make contact 7 of relay 4ADL6 and break contact 3 of relay 6MRL6 to ground.

Relay 5CK shown in FIG. 5 is operated as described elsewhere when the address is properly stored on the digit registration relays. Referring to FIG. 6, make contact 3 of relay 5CK closes a path to operate relay 6LL6. This path also includes make contact 5 of relay 4CFA6 which was previously operated and break contact 4 of relay 6MRL6 which is not operated at this time. Subsequently, make contact 2 of relay 6LL6 operates relay 6MST in FIG. 6 to signify the start of the switching system operation which has been discussed elsewhere.

Upon a satisfactory completion of the requested connection the maker circuit places a ground signal on lead MRL to operate relay 6MRL in FIG. 6. The sequence of operation thereafter is the same as that described following a successful completion of a predetermined conferee request. Under these particular circumstances, relay 6MRL6 in FIG. 6 would operate. Thereafter the controller would be restored to normal by the release of the digit registration relays of FIG. 5 and the release of relays 4ADL6 and 6LL6 of FIGS. 4 and 6.

Each conferee connected to the conference line and bridge circuit 105 as shown in FIG. 1 is supervised individually and this supervisory indication is transmitted to signaling converter 106. The generated signal is converted twice in a manner described elsewhere and thereafter results in a lamp indication in lamp field 104.

Since the conference line and bridge circuit has its ports connected to the line link frame of switching system 108, the supervisory circuit for each port or termination is unique. This situation is created by the fact that circuits connected to the line link frame do not normally supervise their connections. This problem is overcome by providing a polar relay in the receiving channel of each port.

Figure 9:
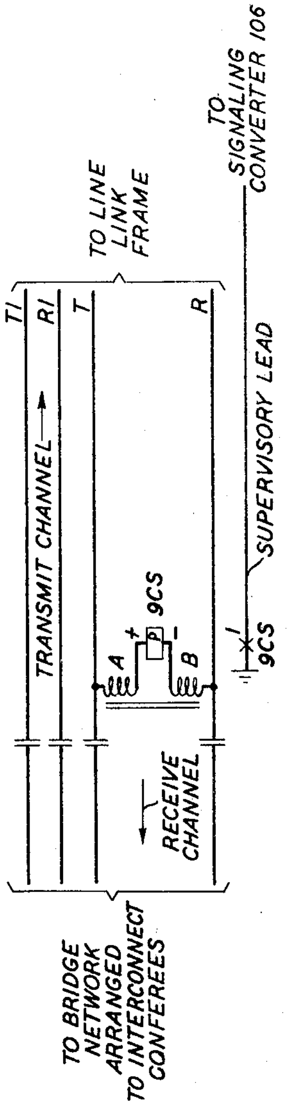
FIG. 9 shows one conference port of the multiport conference line and bridge circuit.

FIG. 9 shows the channel supervisory circuit for one conferee connected to a port of the conference bridge and line circuit. There is an identical circuit associated with each of the ports numbered 1 through 10. The eleventh port is connected to the originator as discussed elsewhere and the twelfth port is unused in this arrangement. As is known in the art, the channels of the twelfth port and those channels which are unused during a particular connection are terminated in the characteristic impedance of the line connected thereto to prevent singing and other interferences.

As seen in FIG. 9, the supervisory circuit for a conference port is connected on one side to a line appearance in the line link frame and on the opposite side to the bridge network or multiway circuit which makes possible the intercommunication of the conference group. The receive channel shows a polar relay designated 9CS bridging the line. The polar relay winding is connected to the lead T by inductor A and to lead R by inductor B. These inductors function herein to make the bridging impedance loss to voice currents (i.e., signals high and at the same time to provide a low direct current resistance operating path for relay 9CS.

In the four-wire switching systems indicated above, the line circuit receive channel T and R leads have negative battery and ground connected respectively thereto before the conferee answers. These potentials may be supplied by the intra-office trunk for example. When the conferee answers the T and R lead potentials are reversed thereby providing an operating circuit for relay 9CS. Thereafter an obvious circuit is completed to ground the supervisory lead by make contract 1 of relay 9CS.

When the conferee disconnects, the battery is removed entirely from the R lead thereby causing relay 9CS to release. When relay 9CS releases the supervisory lead is opened. Referring to FIG. 1, the supervisory lead discussed above is shown as one of a group of leads which interconnects conference line and bridge circuit 105 and signaling converter 106.

It is to be understood that the above-described arrangement is illustrative of the application of the principles of the invention. Numerous other arrangements may be devised by those skilled in the art without departing from the spirit and scope of the invention.

What is claimed is:

1. A switching system comprising a conferencing circuit having a plurality of ports, a plurality of conferee terminations, a station having signaling means, switching means controlled by said station to establish connections between less than all of said plurality of ports and an equal number of said plurality of conferee terminations thereby leaving at least one port vacant,
   stand-by means connected to said station for the duration of the conference connection, said stand-by means comprising selecting means and detecting means and a memory which contains at least one address identifying a termination, said detecting means responsive to a signal from said station, said detecting means effective when responsive to control said selecting means, said selecting means effective when controlled to select an address from said memory, and
   connecting means controlled by said selecting means when the address is selected, said connecting means effective when controlled to establish a connection between said vacant port and a termination identified by said selected address.

2. A telephone conferencing system comprising a conference controller including register means, at least one station having signal means, a communication channel,
   switching means controlled by said station to establish communication over said channel between said controller and said station,
   a plurality of terminating circuits each identified by a distinct address,
   a memory for storing said terminating circuit addresses,
   said controller containing a first control means controlled by said station to select one of said terminating circuit addresses from said memory and to record said selected address in said register means, said controller containing a second control means controlled by said station to record in said register means an address signaled by said station over said channel,
   a conference circuit having a plurality of ports, and connecting means including said switching means activated by said register means when said address is stored therein, said connecting means effective when activated to establish a connection between a port of said conference circuit and said terminating circuit identified by said address recorded in said register means.

3. The invention that is claimed in claim 2 wherein said conference controller also includes detection means and control means, wherein said station is capable of generating at least two distinct signals over said channel, wherein said detection means is connected to said channel to receive said signals, and wherein said detection means is enabled by the detection of one of said distinct signals to control said first control means and by the detection of the other of said distinct signals to control said second control means to cause a said terminating circuit to be connected to a port of said conference circuit.

4. The invention claimed in claim 3 wherein said telephone conferencing system also comprises erasing means, wherein said erasing means is controlled by said connecting means incident to the establishment of said connection between a port of said conference circuit and said terminating circuit, wherein said erasing means is effective when controlled to erase said address recorded in said register means so that said register is prepared for subsequent reuse to record either an address selected from memory or an address signaled by said station.

5. A telephone switching system comprising a station having a plurality of keys subdivided into a first and a second group, a conference circuit having a similarly numbered plurality of ports which are similarly subdivided into a first and a second group, means under control of said station to establish a connection between said conference circuit and said station so as to effect an operational association between like numbered groups of keys and like numbered groups of ports, a plurality of terminating circuits each identified by a distinct address, a memory for storing said terminating circuit addresses, said conference circuit including selecting means and accepting means and connecting means, said selecting means activated by a key operation in the first key group to select and register a stored address from said memory, said accepting means activated by a key operation in the second key group to accept and register an address signaled by said station, and said connecting means alternatively controllable by said selecting means and said accepting means to establish a connection to a terminating circuit identified by said registered address.

6. The invention that is claimed in claim 5 wherein said selecting means includes key recording means, wherein each of said plurality of station keys generates a discrete signal when operated, and wherein said key recording means is immediately responsive to said signals to record each request so that said station key operation is independent of said conference controller operation.

7. A conferencing system including a conference controller means, a station having indicating means and signaling means for generating a first and second signal, switching means controlled by said station to establish a connection between that station and said controller means, said controller means containing a first control means controlled by a first type signal to establish an automatic conference connection and controlled repeatedly by said first control means by a plurality of first type signals to establish a series of automatic connections and said controller means containing a second control means controlled by a second type signal to establish an ad-lib connection, said indicating means controlled by said controller means incident to the receipt of a second type signal to indicate the readiness of said controller to establish an ad-lib connection.

8. The invention claimed in claim 7 wherein said controller includes automatic conference detection means, wherein said detection means is controlled incident to the processing of an automatic conference connection and wherein said detection means is effective when controlled to control said indicating means thereby to result in controller busy indication in the event the controller is busy with at least one request for an automatic connection.

References Cited

UNITED STATES PATENTS

| | | | |
|---|---|---|---|
| 3,133,994 | 5/1964 | Zarouni | 179—18 |
| 3,210,476 | 10/1965 | Shaer | 179—18 |

WILLIAM C. COOPER, Primary Examiner

A. B. KIMBALL, Jr., Assistant Examiner